United States Patent [19]

Gustafson et al.

[11] 3,996,029

[45] Dec. 7, 1976

[54] PURIFICATION OF GASES CONTAINING HYDROGEN FLUORIDE IMPURITY

[75] Inventors: D. C. Gustafson, Antioch, Calif.; F. D. Skinner, Provo, Utah

[73] Assignee: The Dow Chemical Company, Midland, Mich.

[22] Filed: Sept. 26, 1975

[21] Appl. No.: 616,987

[52] U.S. Cl. .................................. 55/71; 423/240; 55/56
[51] Int. Cl.² ....................................... B01D 53/00
[58] Field of Search ...................... 55/71; 423/240

[56] References Cited

UNITED STATES PATENTS

| | | | |
|---|---|---|---|
| 3,074,779 | 1/1963 | Quin | 55/71 |
| 3,488,920 | 1/1970 | Hutchinson | 55/71 X |

Primary Examiner—Frank A. Spear, Jr.
Assistant Examiner—Ethel R. Cross
Attorney, Agent, or Firm—Gary D. Street

[57] ABSTRACT

This invention relates to the removal from gaseous mixtures comprising hydrogen chloride or sulfuryl fluoride and hydrogen chloride of hydrogen fluoride impurity by solubilization of the latter with sulfur dioxide.

8 Claims, No Drawings

PURIFICATION OF GASES CONTAINING HYDROGEN FLUORIDE IMPURITY

BACKGROUND OF THE INVENTION

This invention relates to a process for removal of hydrogen fluoride contaminant from a mixture comprising gaseous hydrogen chloride. In accordance with another aspect, this invention relates to the removal of undesired fluoride contaminant from a gaseous mixture comprising hydrogen chloride and sulfuryl fluoride.

It is known in the art that the hydrogen fluoride contaminant of a gaseous hydrogen chloride mixture can be removed therefrom by intimate contact with silica gel or a liquid composition consisting of water and sulfur trioxide. However, the resulting products, silicon tetrafluoride and chlorosulphonic acid, respectively, are volatile and pass out of the system with the hydrogen chloride, thus requiring additional expense for equipment and procedures to remove these by-products. See, for example, U.S. Pat. No. 3,074,779. Other prior art processes, for example, U.S. pat. No. 3,140,916, require multiple step processes and equipment to achieve the removal of hydrogen fluoride.

The production of sulfuryl fluoride from gaseous mixtures of sulfur dioxide, chlorine and hydrogen fluoride (see U.S. Pat. Nos. 2,875,127 (use as a fumigant) and 2,772,144, 3,092,458 and 3,320,030 (processes) also has attendant problems of removing undesired excess hydrogen fluoride from product mixture containing sulfuryl fluoride. Such hydrogen fluoride apparently forms an azeotrope mixture with by-product hydrogen chloride and the azeotrope mixture cannot be successfully distilled and separated from the sulfuryl fluoride product. While the hydrogen fluoride contaminant can be removed according to prior art methods mentioned above, such methods suffer disadvantages in that additional equipment and procedures, etc., necessary to remove resulting hydrogen fluoride by-products or treat the same prior to waste disposal are encountered at additional expense.

Accordingly, an object of this invention is to provide a process for removing undesired hydrogen fluoride contaminant from gaseous mixtures comprising hydrogen chloride or sulfuryl fluoride and hydrogen chloride. Other objects and aspects, as well as the several advantages of the invention, will become apparent upon consideration of the accompanying disclosure and appended claims.

SUMMARY OF THE INVENTION

It has now surprisingly been found that if a gaseous mixture comprising hydrogen chloride (HCl) and hydrogen fluoride (HF), or comprising HCl, HF and sulfuryl fluoride ($SO_2F_2$), is brought into intimate contact with liquid sulfur dioxide ($SO_2$), the HF contaminant can be solubilized and removed from the HCl or HCl and $SO_2F_2$ components. In the latter instance, the HCl and $SO_2F_2$ product mixture can be further distilled to remove the HCl and obtain the desired $SO_2F_2$ product.

Accordingly, one embodiment of the present invention is directed to a process for the removal from gaseous mixtures comprising HCl and HF of the HF impurity or contaminant which comprises bringing said gaseous mixture into intimate contact with liquid $SO_2$. In another embodiment of the present invention, a process for the removal of HF from a gaseous mixture comprising HCl and $SO_2F_2$ is brought into intimate contact with liquid $SO_2$. In each embodiment, the HF is solubilized in the $SO_2$ and removed, thereby providing HCl or HCl and $SO_2F_2$ products substantially free of HF.

DESCRIPTION OF PREFERRED EMBODIMENTS

As applied illustratively from a procedural standpoint practice of the present invention comprises subjecting or bringing the gaseous mixture to be purified into intimate contact with liquid $SO_2$ and maintaining contact therewith for a sufficient period of time to solubilize and substantially remove the HF component therefrom. The contact of the gaseous mixture to be purified can be done in batch or continuous operations. Preferably, continuous operations are employed.

The apparatus and related accessories necessary to carry out the process of the present invention are conventional and may be along the lines described in the appended examples. Typically, stainless steel sieve tray distillation columns having downcomers, reboiler and tube reflux condenser may be employed. Such apparatus and modifications thereof for carrying out the claimed process will be recognized by those skilled in the art.

In carrying out the process of the present invention, it is only necessary that the gaseous mixture from which HF is to be removed be contacted for a sufficient period of time with the liquid $SO_2$ to solubilize and remove substantially all of the HF component. Preferably, a highly saturated zone of liquid $SO_2$ is maintained. Generally, the gaseous mixture to be purified is introduced into a zone of liquid $SO_2$ in a manner such that the exit gas, e.g., HCl or hCl and $SO_2F_2$, as well as the $SO_2$-HF by-product can conveniently be recovered. Thus, vertically-disposed distillation sieve tray columns, wherein the gaseous mixture can be fed at a point below the $SO_2$ zone and move upwardly therethrough, are highly preferred for use in the present invention. The temperature of the gaseous mixture-$SO_2$ contact zone must be such that the $SO_2$, which has a boiling point of $-10°$ C., is maintained in the liquid state. Usually, a temperature range in the column of from about 90° C. to about $-75°$ C. or less is employed, depending, as will be recognized by those skilled in the art, upon the pressures employed. Those skilled in the art will also recognize that at higher temperatures $SO_2$ is corrosive. Pressures from atmospheric to about 300 psi can be employed, although pressures from about 10 to about 60 psi are preferably employed. For operations where gaseous mixtures comprising $SO_2F_2$ are treated, temperature ranges of from about 20° to $-75°$ C. in the column are preferred.

The degree of HF removal from the gaseous mixture to be purified can be determined by known analytical procedures. Amounts of HF down to about 50 ppm can be detected by present procedures. With the typical apparatus described, various samples can be drawn from different parts of the column and from the gaseous mixture exiting the column to determine the degree of HF removal. Where HF is to be removed from gaseous mixtures comprising HCl, a measured volume of the exit gas is bubbled into a known volume of water and the fluoride content measured using an Orion specific ion electrode. The total acid (HCl) can be obtained by titration to a phenolphthalein end point with caustic.

Where the gaseous mixture comprises HCl and $SO_2F_2$, sample portions of the exit gas can be absorbed in measured volumes of sodium acetate-acetic acid buffer solution and the samples analyzed according to conventional technique for sulfate and fluoride ion concentrations. Since, in the hydrolysis of $SO_2F_2$ in the solution, two moles of fluorine are formed for every mole of sulfate, any excess fluorine present in sample above that obtained from the hydrolysis of a known quantity of $SO_2F_2$ can readily be determined. Thus, the degree of HF removal by the $SO_2$ can readily be determined and those skilled in the art will appreciate that the contact or residence time of the gaseous mixture with the $SO_2$ can be increased where necessary to effect substantially complete removal of HF. It will also be recognized that vapor phase chromatograms of the exit gas can be employed to determine if the $SO_2$ used to remove the HF is vaporizing off with the exit gas, indicating a need to lower the temperature and maintain the $SO_2$ in a liquid state.

Where the gaseous mixture from which HF is to be removed comprises HCl, the HCl component may be directly recovered as the exit gas. It is to be noted, however, that some amount of HCl may also be dissolved in the liquid $SO_2$. Where the gaseous mixture comprises HCl and $SO_2F_2$, the exit gas can be further distilled according to conventional techniques to recover each of the valuable HCl and $SO_2F_2$ products. Additionally, the liquid $SO_2$ containing the solubilized HF can be recycled for utilization as initial reactants in the preparation of $SO_2F_2$ or distilled to recover the $SO_2$ and HF.

The following examples illustrate the practice and advantages of the present invention.

EXAMPLE 1

A 2-inch internal diameter stainless steel sieve tray insulated column having a total of 15 sieve trays with downcomers (e.g., trays with openings so that liquid flowing across the trays downwardly through the column is subjected to vapors rising up the column), and equipped with a thermosyphon reboiler, a stainless steel shell and tube reflux condensor was charged with a chilled (about $-55°$ C.) mixture of $SO_2$ (466 grams), HF (25 grams) and HCl (113 grams). The reflux condensor was refrigerated by a chilled methylene brine and heat was applied to the reboiler by means of an electrical heating coil. Sample ports were located in the vapor space below the first tray (0) and above every third tray from which samples could be drawn for analysis. Thermocouples were employed to measure the temperature at each sample point as well as the column bottoms liquid, bottom vapor, and condensor vent. A Bourdon type pressure gauge equipped with a diaphragm measured the pressure at the top of the column and U-tube filled with fluorocarbon oil was employed to measure the pressure drop across the column.

The charged column was operated at temperatures ranging from about 15° C. at the bottom to about $-60°$ C. at the top under reflux conditions at 15 psi for a period of 5 hours in order to achieve equilibrium. During such time, the reboiler was set at 546 Btu/hr. Following the attainment of equilibrium, vapor samples were drawn and analyzed to determine the HF-HCl contents at various levels and the exit gas (about 10–12 ml dissolved in 10–20 ml water) analyzed for fluoride content using an Orion specific ion electrode and the total HCl determined by titration to a phenolphthalein end point with caustic.

As a result of such operations, the HCl exit gas was found to be substantially free of HF.

EXAMPLE 2

Utilizing substantially the same equipment and procedures as set forth in Example 1, a charge of HF (2.5 grams), $SO_2$ (1 lb.) and HCl (0.25 lb.) were charged into the 15 tray column and the column operated at reflux under 21 psi. The reboiler was set at 160° C. Various measurements of temperature and mole percentages of components at different tray levels were taken after the charge had reached equilibrium. The following results obtained from the zone below the first tray (0) and above every third tray to the top (tray 15) were obtained:

| Tray No. | Temp. °C. | Mole % HF | Mole % $SO_2$ | Mole % HCl |
|---|---|---|---|---|
| 15 | −68.5 | 0.0126 | — | 99.98 |
| 12 | −68.5 | 0.0125 | — | " |
| 9 | −68.5 | 0.0129 | — | " |
| 6 | −59.5 | 0.033 | 20.3 | — |
| 3 | 8.5 | 1.18 | 98.82 | 0 |
| 0 | 10.0 | 9.39 | 90.61 | 0 |

The data obtained illustrates the effective removal of HF from the gaseous mixture (vapors) flowing upwardly through the $SO_2$ zone (e.g., trays 0 through 6), with only minute amounts of HF being present in the HCl vapor in zones 9–15. Other similar operations were carried out, with HF concentrations as high as 60 mole percent at tray 0 and 32% at tray 3 being reduced to 0.2% at tray 15, thus indicating substantially complete removal of HF from the column exit gas (HCl).

EXAMPLE 3

In operations utilizing equipment and procedures as set forth in Examples 1 and 2 above, a chilled mixture (about $-55°$ C.) comprising $SO_2F_2$, HCl, $SO_2$ and about 10–15% by weight HF was charged into the column. After equilibrium of the components had been reached, samples of the column exit gas were absorbed in a given volume of sodium acetate-acetic acid buffer solution and analyzed for fluorine with an Orion specific ion electrode and sulfate ions according to standard tests. Since $SO_2F_2$ hydrolyzes in water to give two moles of fluorine for every mole of sulfate ion formed, the ratio of fluorine/sulfate should theoretically be 2.0 if no additional fluorine from the HF component is present. In such operations with different trials, fluorine to sulfate ion ratios of 1.87, 1.93, 2.19 and 2.14 were obtained, indicating substantial removal of HF by the liquid $SO_2$ zone in the column.

The above described embodiments of the invention are presented for the purpose of illustration. It is to be understood that the invention can be practiced by different embodiments without departing from the spirit and scope thereof and that the invention is not intended to be limited by the above specific embodiments.

We claim:

1. A method for the removal from gaseous mixtures comprising hydrogen chloride and hydrogen fluoride of the hydrogen fluoride contaminant which comprises bringing said gaseous mixture into contact with liquid sulfur dioxide, thereby removing hydrogen fluoride from said mixture.

2. The method of claim 1 which is carried out at temperatures of from about 90° C. to about $-75°$ C.

3. The method of claim 1 which is carried out at pressures of from 0 to about 300 psi.

4. A method for the removal from gaseous mixtures comprising hydrogen fluoride, hydrogen chloride and sulfuryl fluoride of the hydrogen fluoride contaminant which comprises bringing said gaseous mixture into contact with liquid sulfur dioxide, thereby removing hydrogen fluoride from said mixture.

5. The method of claim 3 which is carried out under pressures of from about 10 to about 60 psi.

6. The method of claim 3 which is carried out at temperatures of from about 20° to about −75° C.

7. The method of claim 3 wherein sulfuryl fluoride is recovered from the gaseous mixture following removal of the hydrogen fluoride therefrom.

8. The method of claim 3 wherein the resulting sulfur dioxide and solubilized hydrogen fluoride mixture is employed as a starting material in the preparation of sulfuryl fluoride.

* * * * *